(12) United States Patent
Lin

(10) Patent No.: US 7,055,999 B2
(45) Date of Patent: Jun. 6, 2006

(54) AUXILIARY LIGHT RING DEVICE FOR A VEHICULAR LIGHT

(76) Inventor: Yu-Chu Lin, No. 477, Chung Shan N. Rd., Yung Kang City, Tainan Hsien (TW)

( * ) Notice: Subject to any disclaimer, the term of this patent is extended or adjusted under 35 U.S.C. 154(b) by 117 days.

(21) Appl. No.: 10/937,279

(22) Filed: Sep. 10, 2004

(65) Prior Publication Data
US 2006/0056194 A1     Mar. 16, 2006

(51) Int. Cl.
*B60Q 1/00* (2006.01)
(52) U.S. Cl. ............... 362/548; 362/511; 362/544; 362/545
(58) Field of Classification Search ............. 362/548, 362/511, 544, 545
See application file for complete search history.

(56) References Cited

U.S. PATENT DOCUMENTS 6,471,368 B1 * 10/2002 Lin ........................ 362/216

* cited by examiner

*Primary Examiner*—Stephen Husar
*Assistant Examiner*—Mark Tsidulko
(74) *Attorney, Agent, or Firm*—Rosenberg, Klein & Lee

(57) ABSTRACT

An auxiliary light ring device for a vehicular light includes a holder, a light convergence ring and a plurality of light emission elements. The holder is a hollow reflecting base having an accommodation passage to receive the light convergence ring. A plurality of holes is provided on the circumferential portion of the holder. The light convergence ring is a transparent ring. A plurality of openings is provided on the circumferential portion of the light convergence ring. The light emission elements are placed through each hole and opening to form a light ring through the light convergence ring when the light emission elements are working.

5 Claims, 4 Drawing Sheets

AUXILIARY LIGHT RING DEVICE FOR A VEHICULAR LIGHT

BACKGROUND OF THE INVENTION (a) Field of the Invention

The present invention relates to an auxiliary light ring device for a vehicular light, and more particularly, to an auxiliary light source adapted to the circumference of a vehicular light.

(b) Description of the Prior Art

While essentially lighting the road ahead during night hours, the headlights of an automobile also alert the approaching vehicles. A headlight is a must to an automobile. For the headlights generally available in the market, they are usually relying only upon a reflector to accentuate the light reflection to give the headlight sufficient luminance for reflection. However, in case of darker or foggy circumstances, the lighting effect of the headlight is insufficient. To improve, an auxiliary alert light of the prior art has been introduced by providing a light convergence ring to the circumference of the headlight, and multiple light emission elements are disposed on the light convergence ring so that when the light emission elements are turned on, the light is further converged and reflected through the light convergence ring for warning purposes.

The auxiliary alert light has been well accepted by the market since it provides significant light warning results. However, there is the absence of any barrier to cover up the light convergence ring since there is an open spaced between the light convergence ring and the headlight. Accordingly, the design of the light convergence ring is exposed when viewed directly in front of the headlight, thus to compromise the appearance of the headlight as a whole. Furthermore, the design of the headlight affects the appearance of the body of the automobile. The exposed light convergence ring is detrimental to the style of the body to prevent the presence of the exquisite sense of quality about the headlight.

SUMMARY OF THE INVENTION

The primary purpose of the present invention is to provide an auxiliary light ring device for a vehicular light serving as a highly efficient light convergence and high luminance secondary light source at the circumference of a vehicular light. To achieve the purpose, the present invention comprises a holder, a light convergence ring, and a plurality of light emission elements, and is incorporated with a light adapter. Wherein, the holder is a hollow reflecting base having its inner wall and outer wall to define an accommodation passage and having on its circumferential portion provided with a plurality holes. The light convergence ring is a transparent ring. A plurality of openings is provided on the circumferential portion of the light convergence ring, corresponding to the holes of the holder. A base is provided to each light emission element to retain the light emission element.

The light convergence ring is inserted into the accommodation passage of the holder with the openings of the light convergence ring corresponding to the holes of the holder. Accordingly, when the light emission elements are turned on, a light ring is formed through the light convergence ring.

DETAILED DESCRIPTION OF THE PREFERRED EMBODIMENTS

Figure 1:
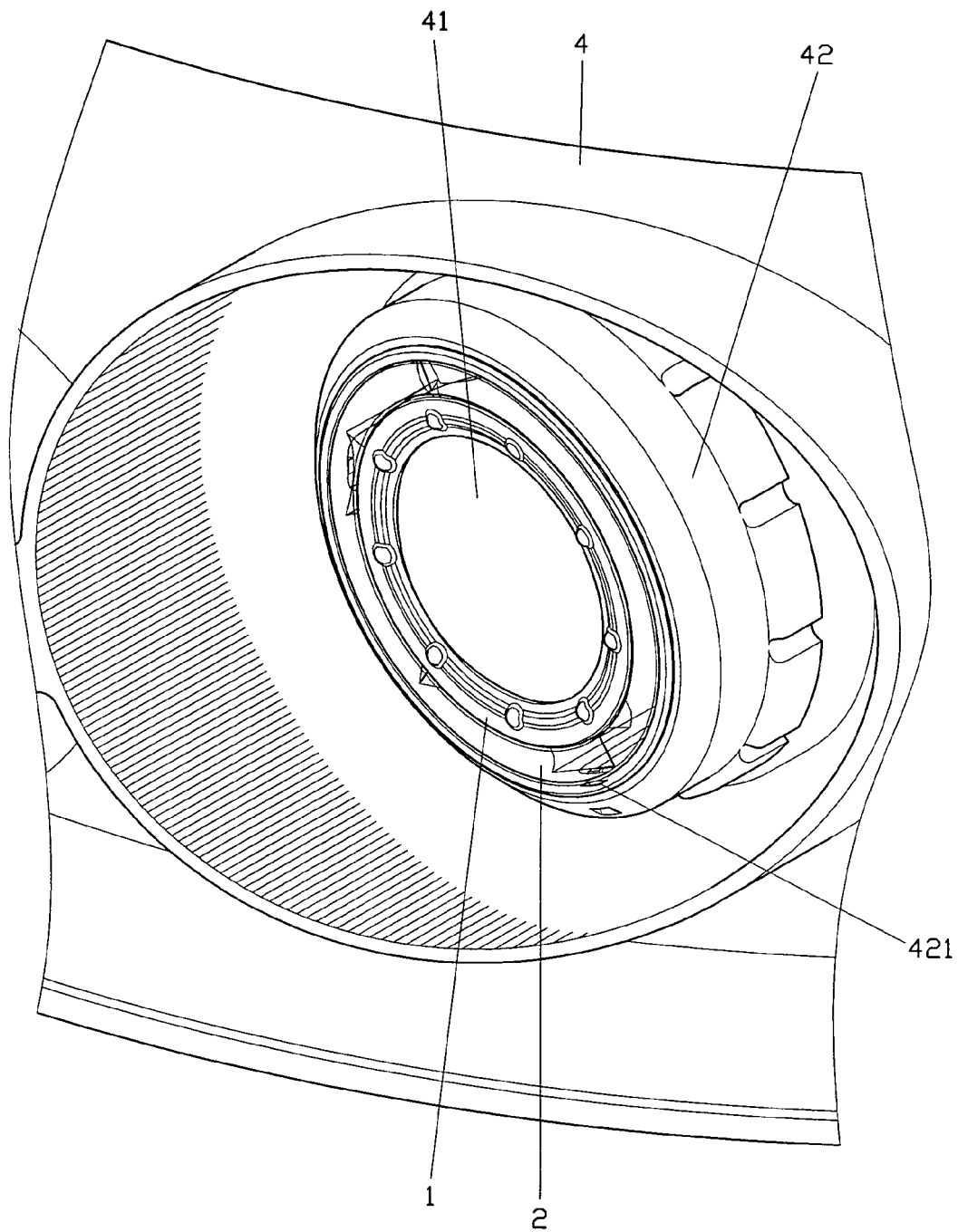
FIG. 1 is a perspective view showing an assembly of a preferred embodiment of the present invention.
Figure 2:
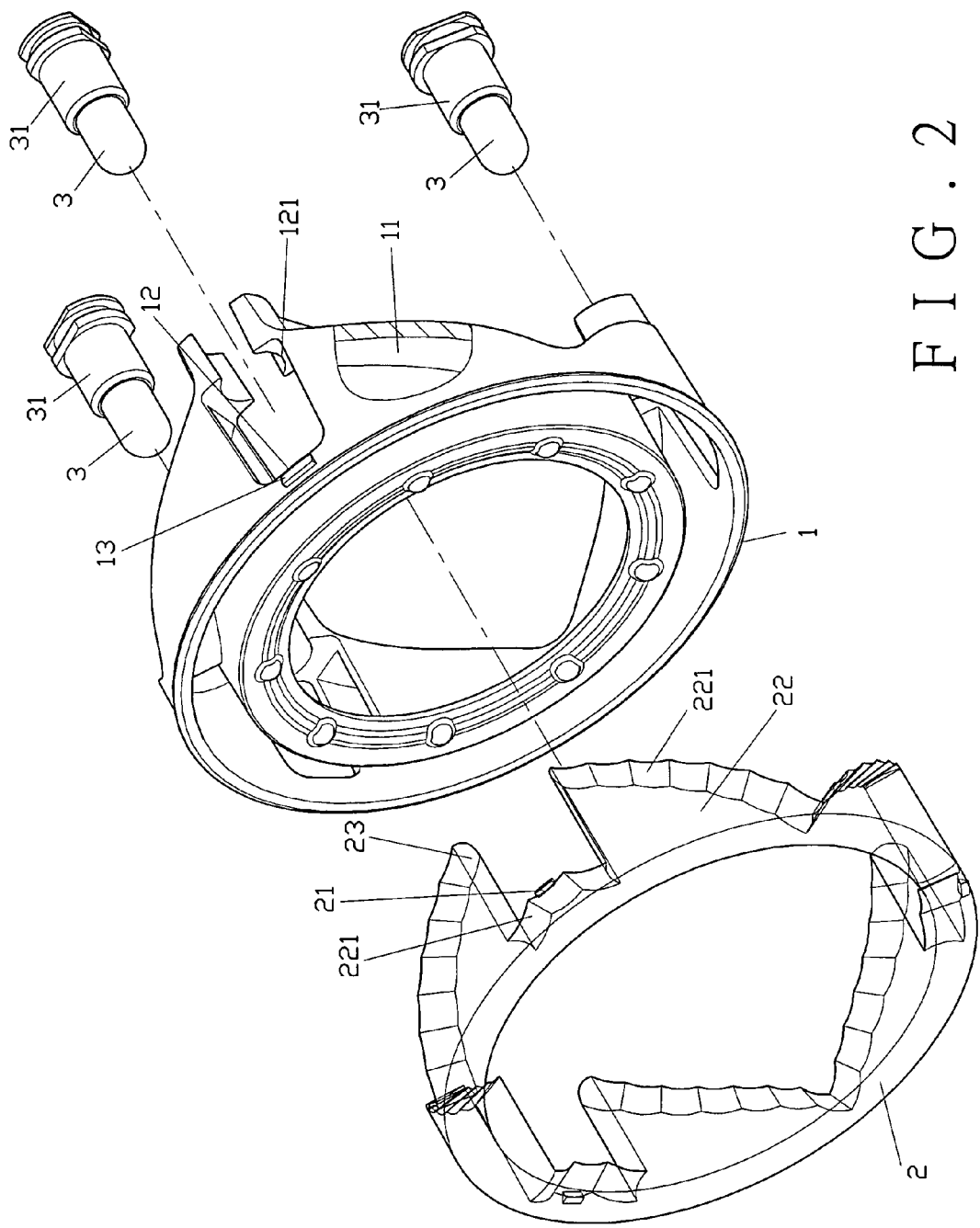
FIG. 2 is an exploded view of the preferred embodiment of the present invention.

Referring to FIGS. 1, and 2, a preferred embodiment of the present invention comprises a holder (1), a light convergence ring (2), and a plurality of light emission elements (3), and is incorporated with a light adapter (4). The light adapter (4) is a reflective adapter to hold a vehicular light (41) in place.

The holder (1) is a hollow reflecting base provided with an accommodation passage (11) defined by an inner wall and an outer wall of the holder (1). The bottom of the holder (1) is corrugated so the route in the accommodation passage (11) is also corrugated relative to the corrugation. A plurality of holes (12) is provided on the circumferential portion of the holder (1). The bottom of each hole (12) is formed with two semi-circular clipping walls (121). A locking bit (13) is provided at the circumferential portion of the holder (1) above each hole (12).

The light convergence ring (2) is a transparent ring having its bottom corresponding to the corrugation on the route of the accommodation passage (11) of the holder (1). A plurality of tenons (21) is provided on the circumferential portion of the light convergence ring (2). The light convergence ring (2) is provided with a corrugated section (22) having its arc corresponding to that of the accommodation passage (11) of the holder (1). A plurality of openings (23) is provided on the outer circumferential portion of the light convergence section (22) relative to the holes (12) of the holder (1). A serrate light convergence wall (221) is formed on the bottom edge of the corrugated section (22) and on the top edge of each opening (23).

A base (31) is provided at the bottom of each light emission element (3).

A hollow seat (42) is provided on the light adapter (4), corresponding to the contour of the vehicular light (41). A plurality of retaining groove (421) is provided on the inner circumferential portion of the seat (42), corresponding to the locking bits (13) of the holder (1).

Figure 3:
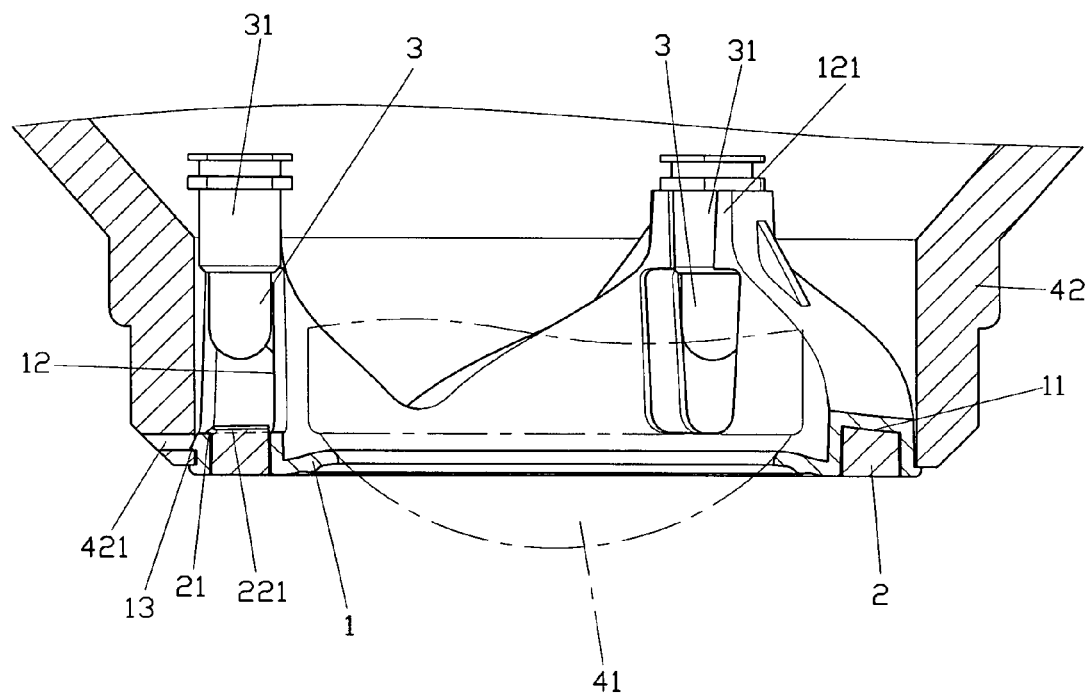
FIG. 3 is a cross-sectional view of the assembly of the preferred embodiment of the present invention.
Figure 4:
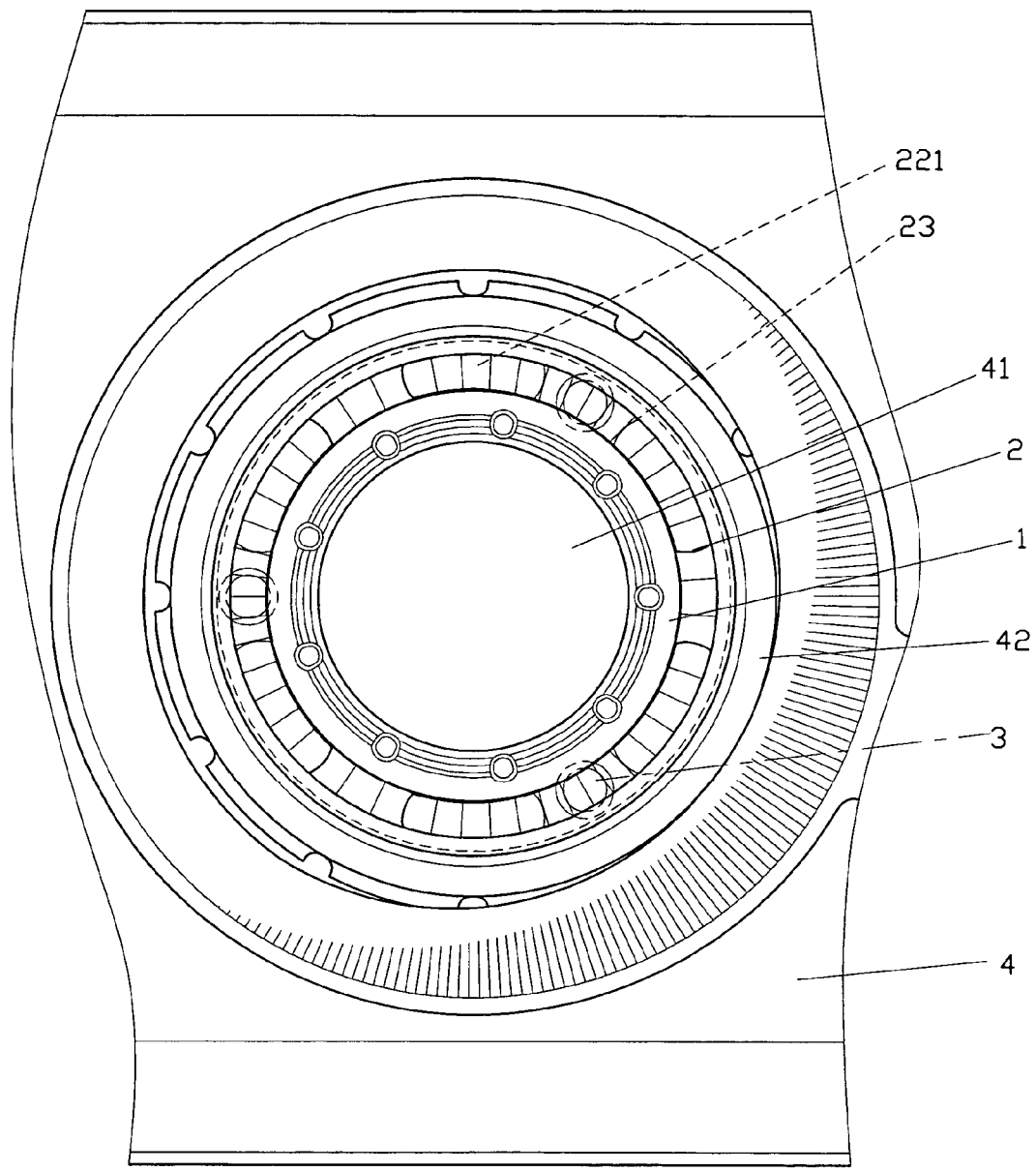
FIG. 4 is a front view of the preferred embodiment of the present invention.

As illustrated in FIGS. 3, and 4, the light convergence ring (2) is first inserted into the accommodation passage (11) of the holder (1) so that the corrugated section (22) and the accommodation passage (11) hold against each other to be secured in position. Each tenon (21) on the light convergence ring (2) is held in place in the edge of the respective hole (12) of the holder (1) so that the light convergence ring (2) and the holder (1) hold against each other to become an integrated part with the openings (23) of the light convergence ring (2) corresponding to the holes (12) of the holder (1). Each light emission element (3) is inserted through the respective hole (12) of the holder (1) and the respective opening (23) of the light convergence ring (2). The base (31) of each light emission element (3) is secured in the clamping walls (121). The light emitted from the light emission elements (3) is orientated toward the light convergence wall (221) of the light convergence ring (2).

Finally, the holder (1) with the light convergence ring (2) and the light emission elements (3) is installed in the seat (42) of the light adapter (4). The locking bits (13) of the holder (1) are secured to the retaining grooves (421) of the light adapter (4). The vehicular light (41) is inserted into the holder (1), and the light convergence ring (2) surrounds the outer circumference of the vehicular light (41).

Since the light convergence ring (2) is made of transparent material, the inner wall of the accommodation passage (11) reflects the light from the light emission elements (3) to the light convergence ring (2). As the bottom of the light convergence ring (2) is corrugated according to its distance from the light source, the corrugated section (22) is capable of giving consistent light. Accordingly, the entire light convergence ring (2) maintains consistent luminance to effectively avoid unfair distribution of light on the light convergence ring (2). Furthermore, the serrate light convergence wall (221) is arranged on the bottom edge of the light convergence ring (2) to more effectively reflect the light from the light emission elements (3).

Upon turning off the vehicular light (41), the light convergence ring (2) may die along with the vehicular light (41), or survive to light on its own depending on the connection of the wiring for the light emission elements (3).

What is claimed is:

1. An auxiliary light ring device for a vehicular light comprising a holder, a light convergence ring and a plurality of light emission elements; the holder being a hollow reflecting base provided with an accommodation passage and a plurality of holes on its outer circumferential portion; the light convergence ring being a transparent ring and being deposed in the accommodation passage of the holder, a plurality of openings relative to the holes of the holder being provided on a circumferential portion of the light convergence ring; and the light emission elements being secured in the openings of the light convergence ring and the holes of the holder to form a light ring through the light convergence ring.

2. The auxiliary light ring device for a vehicular light of claim 1, wherein a plurality of tenons is provided on an outer circumference of the light convergence ring; each tenon holding against an edge of the respective hole of the holder when the light convergence ring is inserted into the holder.

3. The auxiliary light ring device for a vehicular light of claim 1, wherein a light convergence wall is formed on a bottom edge of the light convergence ring.

4. The auxiliary light ring device for a vehicular light of claim 1, wherein a light convergence wall is formed on a top edge of each opening of the light convergence ring.

5. The auxiliary light ring device for a vehicular light of claim 1, wherein the holder has a corrugated bottom and the route in the accommodation passage is corrugated, the light convergence ring being provided with a corrugated section having its arc corresponding to that of the accommodation passage of the holder.

* * * * *